United States Patent
Lee (10) Patent No.: US 7,240,074 B2
(45) Date of Patent: Jul. 3, 2007

(54) STORAGE MEDIUM HAVING OBJECT-ORIENTED PROGRAM

(75) Inventor: Su-jeong Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 437 days.

(21) Appl. No.: 10/705,892

(22) Filed: Nov. 13, 2003

(65) Prior Publication Data

US 2004/0162837 A1    Aug. 19, 2004

(30) Foreign Application Priority Data

Feb. 18, 2003    (KR) .................... 10-2003-0010162

(51) Int. Cl.
*G06F 17/00*    (2006.01)
*G06F 7/00*    (2006.01)

(52) U.S. Cl. .............................. 707/103 R; 707/103 Y (58) Field of Classification Search .................... 707/2, 707/203, 103 R–103 Z, 206, 101, 104.1; 717/1–4; 709/202, 206, 251, 302
See application file for complete search history.

(56) References Cited

U.S. PATENT DOCUMENTS

| | | | | |
|---|---|---|---|---|
| 5,463,390 A | | 10/1995 | Whiting et al. | |
| 5,802,352 A | * | 9/1998 | Chow et al. | 715/517 |
| 5,809,507 A | * | 9/1998 | Cavanaugh, III | 707/103 R |
| 6,028,998 A | | 2/2000 | Gloudeman et al. | |
| 6,119,125 A | * | 9/2000 | Gloudeman et al. | 707/103 R |
| 6,141,595 A | * | 10/2000 | Gloudeman et al. | 700/83 |
| 6,151,623 A | * | 11/2000 | Harrison et al. | 709/206 |
| 6,178,545 B1 | * | 1/2001 | Nagashima et al. | 717/108 |
| 6,243,861 B1 | * | 6/2001 | Nitta et al. | 717/108 |
| 6,466,944 B1 | | 10/2002 | Stokes | |
| 6,557,165 B1 | * | 4/2003 | Nagashima et al. | 717/108 |
| 6,681,234 B2 | * | 1/2004 | Sokolov et al. | 707/206 |

FOREIGN PATENT DOCUMENTS

JP    11-126162    5/1999

OTHER PUBLICATIONS

Office Action issued by KIPO on Nov. 19, 2004.
Korean Office Action for Application No. 10-2003-0010162.
"Object Directional: Serializing Methods." *DDJ DDJ* vol. 6, Ed. 7 (Jun. 1, 1997): 120-132.
Japanese Office Action issued Mar. 13, 2007 in corresponding Japanese patent Application 2004-026967.

* cited by examiner

*Primary Examiner*—Jeffrey Gaffin
*Assistant Examiner*—Jacques Veillard
(74) *Attorney, Agent, or Firm*—Staas & Halsey LLP (57) ABSTRACT

A master class to create any kind of an object, to thereby allow functions to be easily added, changed, or deleted without changing a program interface environment by change of content to be implemented.

21 Claims, 7 Drawing Sheets

---

MESSAGE OBJECT(MASTER CLASS)

ATTRIBUTE
  1. MESSAGE NAME(ITEM DISCRIMINATOR)
  2. ITEM TYPE(ITEM TYPE INFORMATION)
  3. MEMORY ADDRESS(ADDRESS INFORMATION)
FUNCTION
  DATA STORING FUNCTION;
  DATA RETRIEVING FUNCTION;
  STRING CONVERSION FUNCTION;
  OBJECT RESTORING FUNCTION;

FIG. 1

MESSAGE OBJECT(MASTER CLASS)

ATTRIBUTE
 1. MESSAGE NAME(ITEM DISCRIMINATOR)
 2. ITEM TYPE(ITEM TYPE INFORMATION)
 3. MEMORY ADDRESS(ADDRESS INFORMATION)
FUNCTION
  DATA STORING FUNCTION;
  DATA RETRIEVING FUNCTION;
  STRING CONVERSION FUNCTION;
  OBJECT RESTORING FUNCTION;

FIG. 2

| MESSAGE NAME OF LAYER 0 | DISCRIMINATOR | MESSAGE NAME OF LAYER 1 | DISCRIMINATOR | MESSAGE NAME OF LAYER 2 |
|---|---|---|---|---|
| NAME 0 | | NAME 1 | | NAME 2 |

FIG. 3A

| LAYER 0 | | LAYER 1 | | LAYER 2 | |
|---|---|---|---|---|---|
| MESSAGE NAME | "MESSAGE EXAMPLE" | | | | |
| LIST ITEM TYPE | MESSAGE OBJECT TYPE | | | | |
| LINKED LIST | POINTER MESSAGE OBJECT | MESSAGE NAME | "SAMPLE1" | | |
| | | LIST ITEM TYPE | STRING TYPE | | |
| | | LINKED LIST | POINTER "SAMPLE STRING1" | | |
| | | | POINTER "SAMPLE STRING2" | | |
| | | MESSAGE NAME | "SAMPLE2" | | |
| | | LIST ITEM TYPE | MESSAGE OBJECT TYPE | | |
| | | LINKED LIST | POINTER MESSAGE OBJECT | MESSAGE NAME | "SAMPLE3" |
| | | | | LIST ITEM TYPE | STRING TYPE |
| | | | | LINKED LIST | POINTER "SAMPLE SUB STRING1" |
| | | | | | POINTER "SAMPLE SUB STRING2" |
| | | | | MESSAGE NAME | "SAMPLE4" |
| | | | | LIST ITEM TYPE | INTEGER TYPE |
| | POINTER MAESSAGE OBJECT | | | LINKED LIST | POINTER 10000 |
| | | | | | POINTER 20000 |

STORAGE MEDIUM HAVING OBJECT-ORIENTED PROGRAM

CROSS-REFERENCE TO RELATED APPLICATIONS

This application claims the benefit of Korean Patent Application No. 2003-10162, which was filed on Feb. 18, 2003, in the Korean Intellectual Property Office, the disclosure of which is incorporated herein by reference.

BACKGROUND OF THE INVENTION

1. Field of the Invention

The present invention relates to a storage medium having an object-oriented program comprising objects having object items storing optional data and a plurality of functions processing data through the object items, and, more particularly, to a storage medium having an object-oriented program that reduces time and cost of class design and program development by dynamically creating various kinds of objects from one class.

2. Description of the Related Art

A conventional procedural-oriented program includes a data structure and an algorithm changing data. Because the conventional procedural-oriented program cannot express a relationship between the data and functions very well, repair and maintenance have been limited due to changes in the algorithm, and the reuse of source codes.

Thus, to produce a program of which the repair, maintenance, and code reuse can be easily accomplished, an object-oriented program is presented herein that achieves the intended result by allowing objects having typical data thereof and methods, i.e., functions performing operations with the data, to communicate with each other through messages.

Herein, the objects indicate program modules having functions associated with particular data, as conceptual units classified for effective data management. The data is used to store attributes of the objects, and the functions define functions that the objects can perform. Each object must have at least one item. In object-oriented programming languages such as C++, Java, Python, and the like, the objects are created from object classes that supply frames to the objects so that the objects can include and perform common characteristics and actions.

Herein, each object usually has data stored in items having a predetermined type and number. Thus, if the types or the number of the items are different from each other, the classes must be respectively defined for the objects.

Therefore, there needs to be a way to accomplish the repair, maintenance, and code reuse, which are aims of the object-oriented programming languages, by creating various kinds of objects from one class.

Object serialization is defined as streaming the objects for communicating content of the objects in a byte stream through files or networks. Also, restoring serialized data to an original object is defined hereinafter as deserialization. The advantages of the object serialization are to provide persistency since the content of the objects can be stored in files independently of input/output types, and to allow the objects to be easily communicated through networks.

C++ provides a serialization method in the object class to perform the serialization/deserialization, and allows the objects to be serialized. Thus, there is a problem that procedures overriding a serialization method on each class and customizing the overridden serialization method suitably to characteristics of each class must be accompanied, for the object serialization.

SUMMARY OF THE INVENTION

Accordingly, it is an aspect of the present invention to provide a storage medium having object-oriented program capable of reducing time and cost taken for class design and program development, by providing one class that does not have limited item types and number to create various kinds of objects.

Additional aspects and/or advantages of the present invention will be set forth in part in the description that follows and, in part, will be obvious from the description, or may be learned by practicing the present invention.

The foregoing and/or other aspects of the present invention are achieved by providing a storage medium having an object-oriented program comprising an object having object items to store optional data and a plurality of functions processing the data through the object items, comprising: a master class comprising an item discriminator selectively storing item names of the object items, an item type information selectively storing an item type of data to be stored in the object item, and address information pointing a memory address stored with the data, and functions, comprising a data storing function receiving the item discriminator, the item type and data value, and allowing the object item to store the data.

In an aspect, the item discriminator includes a string.

In an aspect, the item type information is expressed as a string, and includes the master class so that a corresponding object item can point to another object item storing at least one data.

In an aspect, the address information comprises a list of pointers to store one or more data.

In an aspect, the item discriminator inputted from the data storing function comprises location information of a predetermined data structure, relation between objects formed by allowing the object items in the object to point other object item, and the data storing function stores the data in an object item of a position corresponding to the location information.

In an aspect, a number of layers of the data structure is increased as the object items are linked more and more, and the location information of the data structure comprises item discriminators of other object items provided in an upper layer hierarchically linked to an object item to be stored with data, and separators separating the item discriminators of the object items.

In an aspect, if an object item exists in a position corresponding to the location information in the data structure, the data storing function sets up the item type as an array item type such as an integer array or a string array, and additionally stores the data in the object item.

In an aspect, if an object item positioned in each layer among the location information does not exist in the data structure, the data storing function creates an object having a name of the object item not existing in each layer as an item discriminator, and a master class as an item type.

In an aspect, the master class further comprises a string conversion function converting data in the object to a string, and the string conversion function converts the object items to a string comprising an item discriminator, an item type, the number of the data, and content of the data.

In an aspect, the string conversion function is recursively performed as the number of the data when the string converting function confirms that an item type of the object item is a master class.

In an aspect, the converted string further includes object item separators between the converted strings corresponding to the respective object items.

In an aspect, the master class further comprises an object restoring function restoring a string having data in an object to an original object, and the object restoring function restores the string by applying the data storing function to information of each object item separated from the converted string.

In an aspect, the object restoring function is assigned with memories according to the number of the data in the information of the respective object items separated from the converted string and stores the data sequentially in the memories.

BRIEF DESCRIPTION OF THE DRAWINGS

These and/or other aspects and/or advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 1:
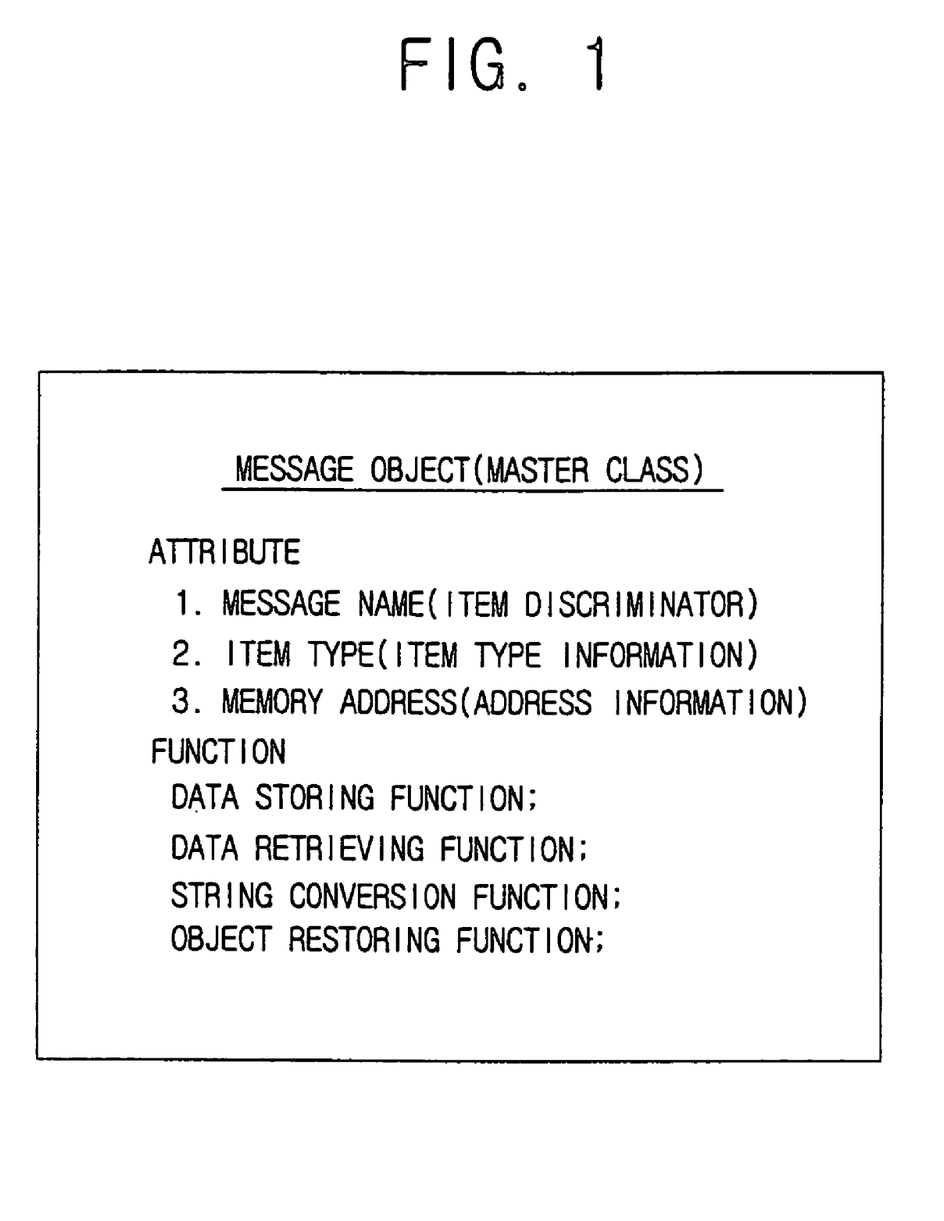
FIG. 1 is a block diagram of a master class according to an embodiment of the present invention.

FIG. 1 is a block diagram of a master class according to an embodiment of the present invention. As shown in FIG. 1, the master class according to the present invention has attributes comprising a message name (item discriminator), an item type (item type information), and a memory address (address information).

The message name may be declared as a string type of item types, and indicates the item discriminator capable of storing an item name of an object item.

The item type may be declared as a string type of the item types, and indicates the item type information of data referred to as an item name.

Herein, the item type can include a master class type defined in the present invention, that is, an item type of a message object class, i.e., existing item types, such as an integer, a real, a string, an integer array, a real array, a string array, etc.

In an existing class configuration, because the object items and the item types corresponding to the object items are previously determined in class design and are not changed, if a user intends to access data stored in the respective object items by using functions in the object, parameters having item types corresponding to the object items must act as intermediaries in the functions.

However, because the message object class according to the present invention receives the item discriminators and the item types indicating the object items as the parameters of the functions, the item type of the object item is not previously determined, but is dynamically determined when data is stored in a corresponding object item.

The address information comprises a list of pointers indicating one or a plurality of data, which has the same item types and is indicated as the item discriminator. Thus, the object items can include a single and an array item type, and the size of the object items is not limited by a linked list structure.

A linked list is a useful data storing method capable of being easily implemented in the C language, wherein data linking is defined in a pointer type by information included in the data. Herein, a pointer provides a data linking method by providing address information of the linked data.

Since the address information comprises only the list of the pointers, the address information is not limited by the item types to be indicated.

Also, the master class type is used as the item type of the object item in the class so that the object item can indicate other object items storing at least one data value, and a sub-list can be constructed with at least one master class object linked to the object item.

Through above procedures, one object created from the master class can have a data structure with a complicated tree structure, which is related to the objects, wherein object items in the object point to other object items, and the relation is formed accordingly.

Herein, the item type to be located in a first layer is selected as a master class item type so that the master class object can have different kinds of object items. Thus, an item discriminator in the first layer of one object created from the master class object can be used not to indicate an item name of the first layer, but to indicate a name of the created object itself.

Herein, the layer includes location information of an object according to the relation, as a predetermined data structure, which means relation among objects formed by allowing object items in an object to point to another object item.

That is, according to the present invention, object items linked to each other are respectively in a layer different from each other. Thus, the number of layers is increased according to the number of relations.

For example, assuming that one created object is in a layer 0, it can be set up that object items linked to the created object are in a layer 1, and object items linked to the object items in the layer 1 are in a layer 2, etc.

Figure 2:
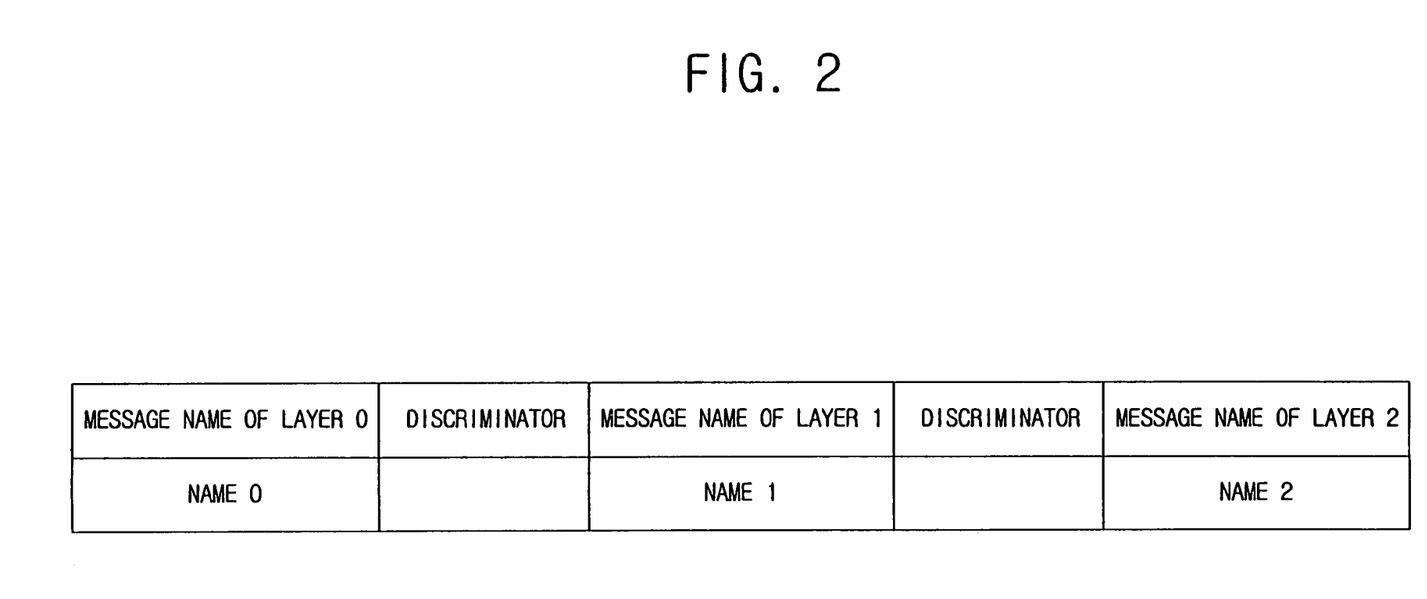
FIG. 2 is a view illustrating item discriminators comprising location information according to an embodiment of the present invention.

FIG. 2 is a view illustrating item discriminators comprising location information according to an embodiment of the present invention.

As shown in FIG. 2, the location information of data using separators is created, so that the data can be easily created and retrieved.

As described above, a message name of the layer 0 corresponds to an item discriminator pointing to a message object itself.

Also, a message name of the layer 1 corresponds to an item discriminator of the message object, which is pointed to by the address information of the layer 0. Similarly, a message name of the layer 2 corresponds to the item discriminator of the message object, which is pointed to by the address information of the layer 1.

Further, message names of respective layers, item discriminators are separated by separators. In the embodiment according to the present invention, "." is used as a separator, but characters that are not used as the message name, such as "/", "@", and the like, can be also used as separators.

Herein, it is preferable that the item type of a layer pointing to a following layer be the master class type, to thereby enable data pointed to by the respective layers to be linked hierarchically to each other.

Figure 3A:
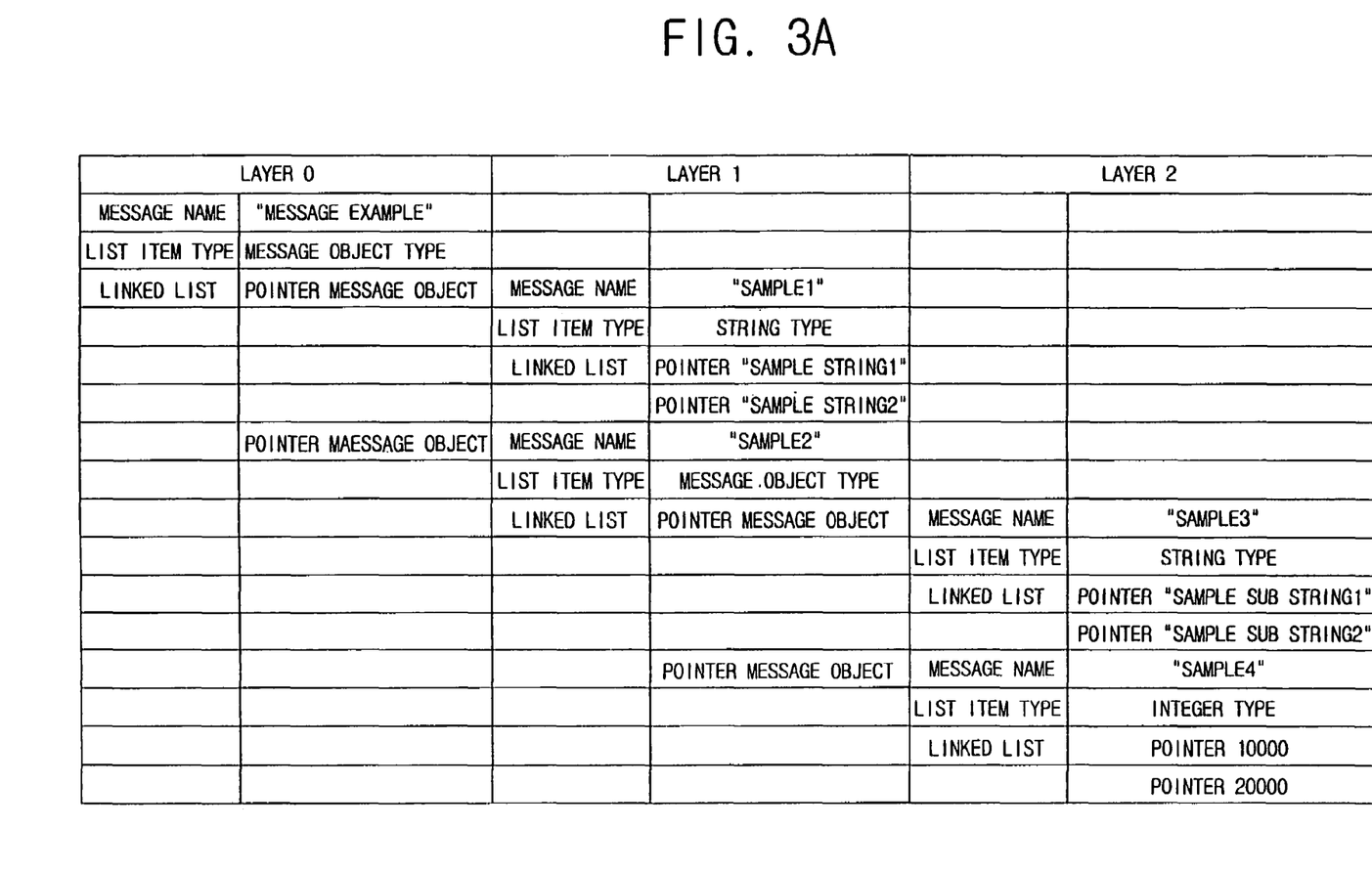
FIGS. 3A and 3B are views illustrating examples of data structures, wherein a data storing function of the present invention is used to form the data structures.

FIG. 3A is a view illustrating examples of data structures, wherein a data storing function of the present invention is used to form the data structures.

As shown in FIG. 3A, the layer 0 has a "message example," which is an item discriminator indicating an object itself created by object-oriented program according to an embodiment of the present invention; item types of a "sample 1" and a "sample 2," which are message object item types stored in the layer 1 which will be followed; and a message object storing with a pointer, which is address information respectively pointing to the "sample 1" and the "sample 2."

The layer 1 has a message object stored with an item discriminator, the "sample 1;" a string type which is an item type of a "sample string 1" and a "sample string 2," which is data; and pointers, which are address information respectively pointing to the "sample string 1" and the "sample string 2."

Also, the layer 1 has a message object stored with an item discriminator, the "sample 2;" an item type of a "sample 3" and a "sample 4," which is a message object item type stored in the layer 2, which will be followed; and pointers, which are address information respectively pointing to the "sample 3" and the "sample 4."

The layer 2 has a message object stored with an item discriminator, the "sample 3;" a string type which is an item type of a "sample sub string 1" and a "sample sub string 2," which is data; and pointers, which are address information respectively pointing to the "sample sub string 1" and the "sample sub string 2."

Also, the layer 2 has a message object stored with an item discriminator, the "sample 4;" a string type which is an item type of a 10000 and a 20000, which is data; and pointers, which are address information respectively pointing to the 10000 and the 20000.

Figure 3B:
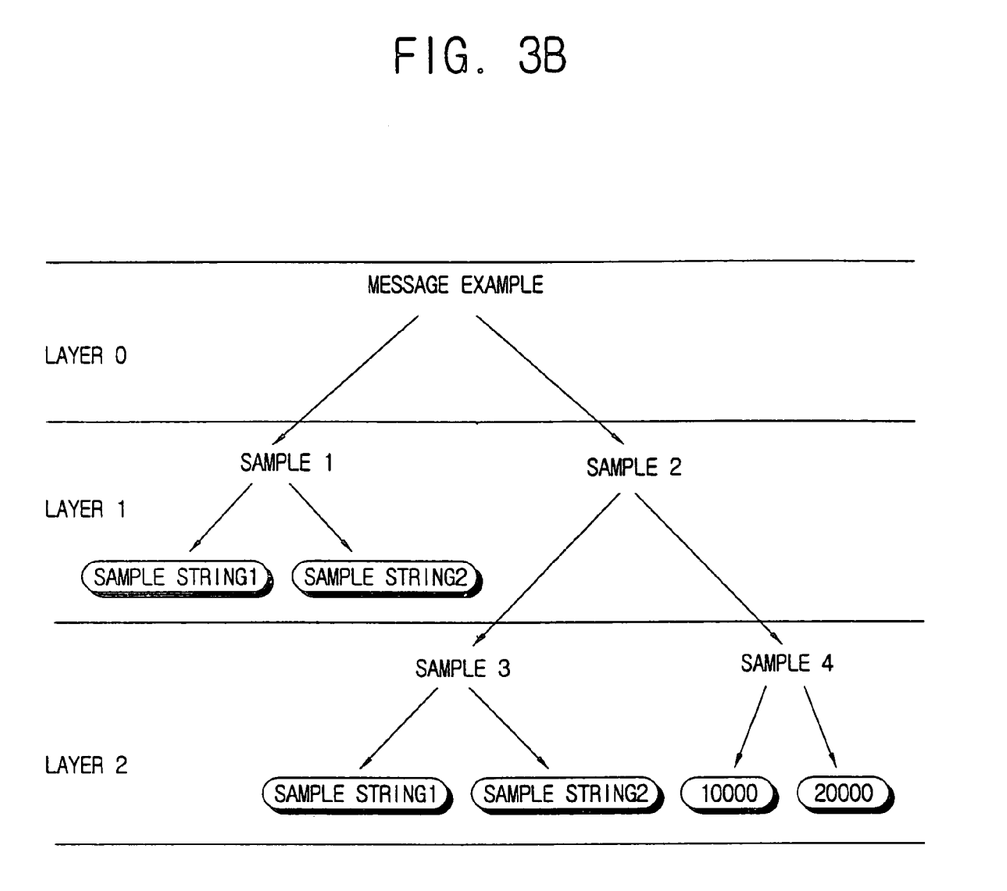

FIG. 3B is a view schematically illustrating examples of data structures that are stored in the object items of FIG. 3A. In FIG. 3B, arrows indicate pointers, and rounded boxes indicate data.

As shown in FIG. 1, the master class has the object item for storing the attributes thereof, and a plurality of functions accessing the object item and performing expecting works about data.

In the embodiment according to the present, the data storing function, a data retrieving function, a string converting function, and an object restoring function are selectively used.

Figure 4:
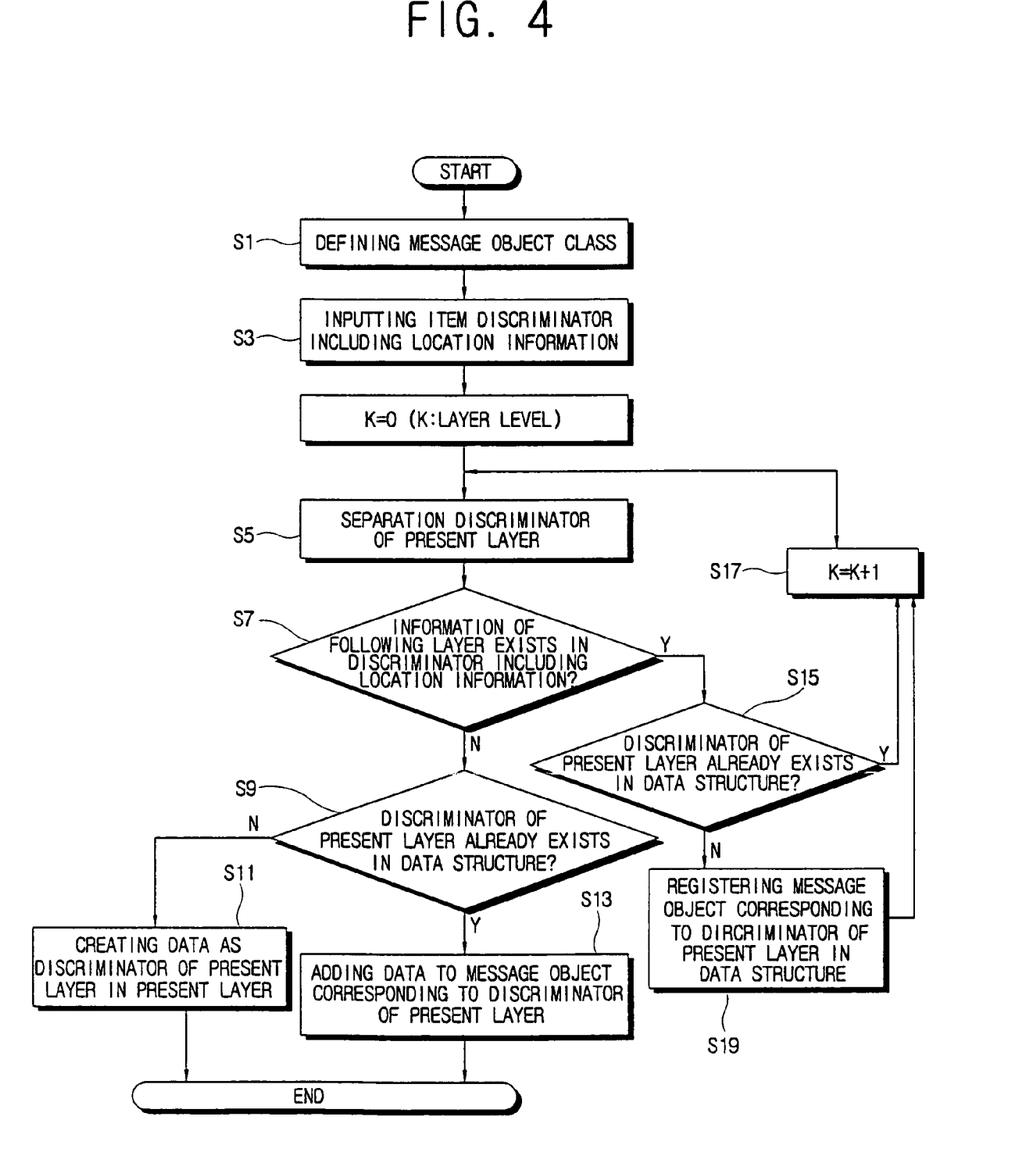
FIG. 4 is a flow diagram illustrating operation of the data storing function according to an embodiment of the present invention.

FIG. 4 is a flow diagram illustrating operation of the data storing function according to an embodiment of the present invention.

The data storing function according to the present invention has an item discriminator, an item type, and a data value as parameters.

At first, the message object class is defined (S1).

That is, defined is a master class comprising an item discriminator selectively storing an item name of an object item, an item type information selectively storing an item type of data to be stored in the object item, and address information pointing to a memory address storing the data.

The item discriminator is inputted with location information in a data structure corresponding to data to be created included so that the data can be created in an intended position (S3). Hereinafter, an item discriminator including the location information is defined as discriminator information.

As described above, the location information in the data structure comprises separators separating layers expressing a hierarchy of the data structure.

The inputted discriminator information allows the data to be created in the intended position. A process for creating data in the intended position will be described as follows.

At first, information corresponding to a message name of a present layer, for example, a layer k, among the discriminator information is separated (S5).

Whether information of a following layer, for example, information corresponding to a layer k+1, exists in the discriminator information is confirmed (S7). According to an embodiment of the present invention, because each layer is separated by the separators, if the discriminator information has the separator, it is determined that data corresponding to the following layer exists.

If it is determined that information of the following layer does not exist, it is confirmed whether an object item having the same item discriminator as the message name of the present layer k among the discriminator information already exists in the data structure (S9).

If the message object having the same item discriminator as the message name of the present layer k among the discriminator information does not exist in the data structure, a message object having the message name is created (S11).

The creating the message object comprises assigning a storing memory space for the new message object and storing the message name of the present layer k in the item discriminator, and storing address information of data to be stored in the assigned address information of the message object.

In the meanwhile, if the same message object as the message name of the present layer k among the discriminator information exists in the data structure, address information of the data to be stored is added to the address information of the message object (S13).

The adding the address information of the data to be stored to the address information of the message object depends on the item type of the message object.

If the item type of the message object is not an array-type item, the item type of the message object is converted to the array-type item.

When it is confirmed whether information corresponding to the following layer, for example the layer K+1, is included in the discriminator information (S7), if it is determined that the information corresponding to the following layer exists, it is confirmed whether the same message object as the message name of the present layer k among the discriminator information exists in the data structure (S15).

If the same message object as the message name of the present layer k among the discriminator information exists in the data structure, procedures are recursively performed from the S5, after moving to the following layer K+1 (S17).

In the meanwhile, if the same message object as the message name of the present layer k among the discriminator information does not exist in the data structure, a message object having the message name of the present layer k among the discriminator information as an item discriminator is registered (S19).

Herein, the registering the message object comprises assigning the message object having the message name of the present layer k of the discriminator information as the item discriminator.

After registering the message object, procedure is moved to the following layer k+1 (S17), and recursively performed from the operation S5.

The data storing function creating data in an intended position of the data structure, and the data retrieving function reading data in an intended position of the data structure are similar in an accessing process for the data. After both functions access the intended position by using the address information of each message object, there is a difference in that the data is stored in the intended position in the case of creating, and read from the intended position in the case of retrieving.

Figure 5:
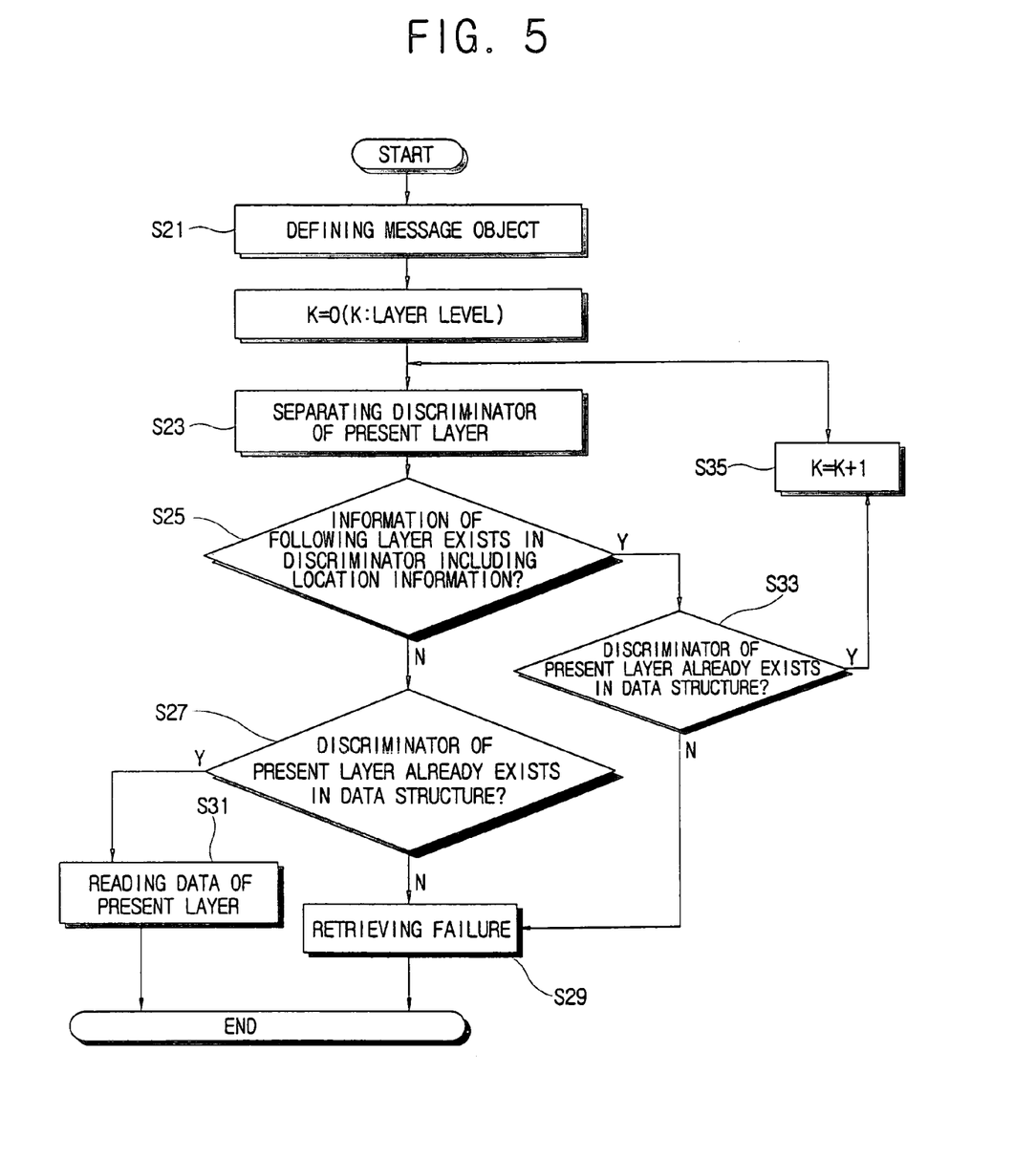
FIG. 5 is a flow diagram illustrating operation of a data retrieving function according to an embodiment of the present invention.

In the data structure formed by the method as described above, a process for retrieving the data value will be described with reference to FIG. 5.

The data retrieving function according to the present invention has an item discriminator corresponding to the data value to be read as a parameter thereof.

A discriminator is inputted including location information in the data structure of the data to be retrieved (S21).

Information corresponding to a message name of a present layer, for example, a layer k, among the discriminator information is separated (S23).

Whether information of a following layer, for example, information corresponding to a layer k+1, exists in the discriminator information is confirmed (S25). According to an embodiment of the present invention, because each layer is separated by the separators, if the discriminator information has the separator, it is determined that data corresponding the following layer exists.

If it is determined that information of the following layer does not exist, it is confirmed whether an object item having the same item discriminator as the message name of the present layer k among the discriminator information already exists in the data structure (S27).

If the message object having the same item discriminator as the message name of the present layer k among the discriminator information does not exist in the data structure, the retrieving the data is determined to have failed (S29).

If the message object having the same item discriminator as the message name of the present layer k among the discriminator information exists in the data structure, the address information of the message object is used, and the data of the message object is read (S31).

When it is confirmed whether information corresponding to the following layer, for example, the layer K+1, is included in the discriminator information (S25), if it is determined that the information corresponding to the following layer exists, it is confirmed whether the same message object as the message name of the present layer k among the discriminator information exists in the data structure (S33).

If the same message object as the message name of the present layer k among the discriminator information exists in the data structure, procedures are recursively performed from the S23, after moving to the following layer K+1 (S35).

If the message object having the same item discriminator as the message name of the present layer k among the discriminator information does not exist in the data structure, the retrieving the data is determined to have failed (S29).

Figure 6:
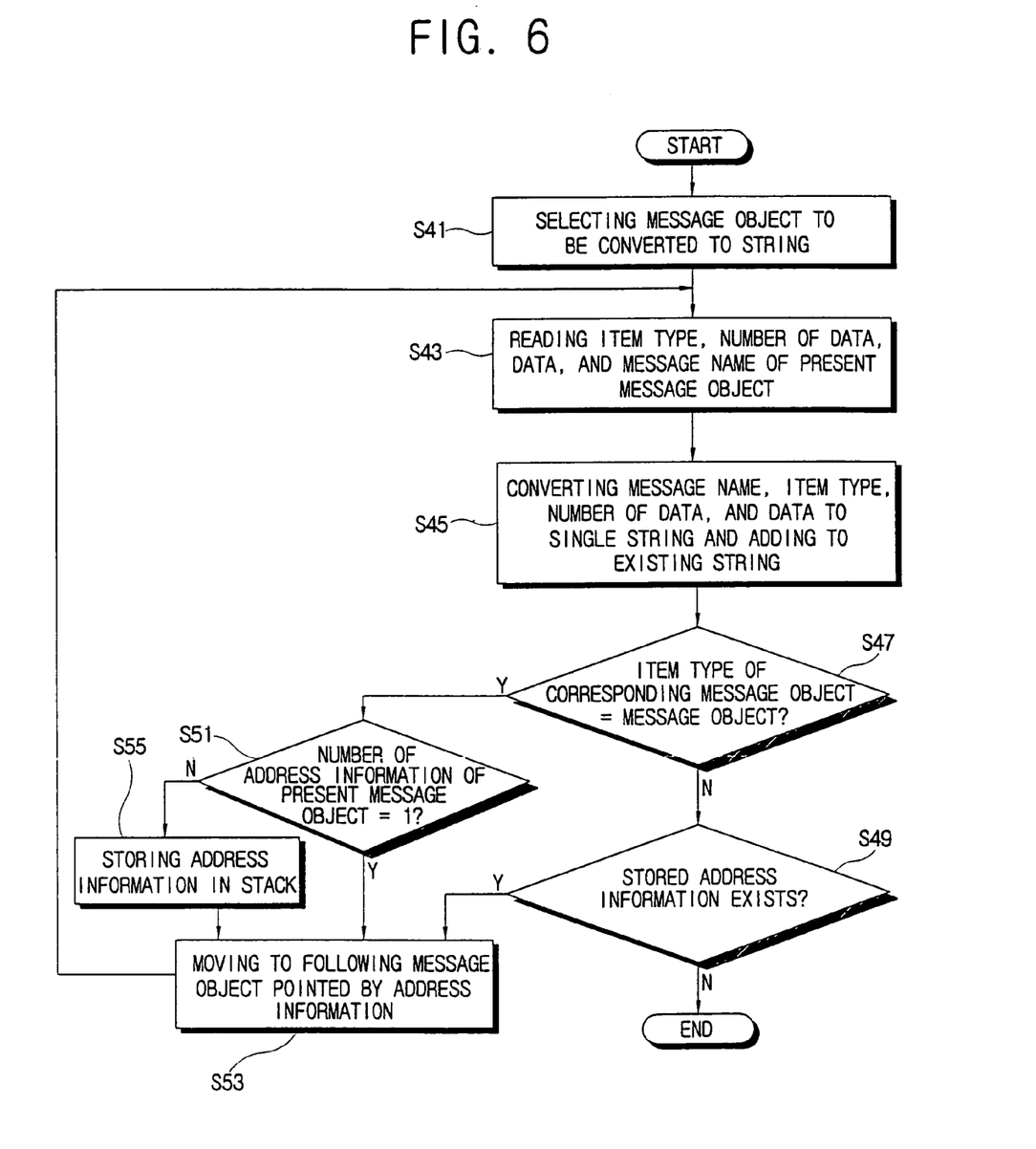
FIG. 6 is a flow diagram illustrating operation of a string converting function according to an embodiment of the present invention.

A function converting data of a message object having the data structure created by the above method to a string will be described with reference to FIG. 6.

Converting the data stored in all the object items in one object, that is, the data hierarchically linked to a top level message object in the data structure to one string, and restoring the converted string to the hierarchical data structure, are useful for transferring the data.

The string converting function according to an embodiment of the present invention has a discriminator, a name of a message object to be converted to a string, as a parameter thereof.

At first, the message object to be converted to the string is selected (S41).

Secondly, an item discriminator corresponding to a present layer is extracted from discriminators of the message object selected sequentially according to respective layers, and an item type of data, the number of data, content of data, and a message name of the message object is read (S43). The message name, the item type of the data, and the content of the data can be extracted from the corresponding information, and the number of the data can be read by examining the number of address information. The content of the data can be read sequentially as the address information corresponding to the data is read.

The extracted information is used, then the message name of the corresponding message object is written, and the item type of the data, the number of the data and the content of the data is converted to a string, and the converted string is added to an existing string (S45).

Separators are added to allow the message object to be separated before adding the converted string to the existing string.

The operations S43 and S45 are performed, which enables the data stored in the data structure to include information necessary for being restored to an original data structure.

If the item type of the corresponding message object is the message object, it is preferable that operation is recursively performed as the number of the data, which will be described as follows.

It is confirmed whether the item type of the corresponding message object is the message object (S47). If it is determined that the item type of the corresponding message object is the message object, the operations S43 and S45 are recursively performed for the stored data sequentially as the number of the data pointed by the message object.

It is confirmed whether the number of the data pointed by the message object is 1 (S51). If the number of the data pointed by the message object is 1, moving to a following message object pointed by the corresponding message object is performed (S53). If the number of the data value pointed by the message object is more than 1, the rest of the address information is stored in a stack (S55), moving to a message object pointed by a first address information is performed (S53).

Herein, the stack is an information storing method allowing information stored last to be processed first. When the item type of a present message object is the message object, and the present message object has a plurality of address information, the operations following the operation S43 are recursively performed.

That is, because the operations S43 through S47 show a procedure that one object is converted to a string, if data to be converted to a string still exists (S49), the operations following operation S43 are recursively performed.

The operations S41 through S55 are performed, which make information of data in an object to be converted to a string.

The converting the data in the object to a string, when two or more different programs are operated, enables the data to be transmitted to other programs.

The program receiving the data converted to the string can restore the converted string to an object having an original data structure by using the data storing method in the object described above. The data restoring function to an object having an original data structure can restore the converted string by applying the data storing function to information of respective object items separated from the converted string.

That is, the object restoring function is assigned with memories according to the number of the data in the information of the respective object items separated from the converted string and stores the data sequentially in the memories.

The information of one object item separated from the string converted by the string converting function according to the present invention includes an item type, the number of the data, content of the data, and an item discriminator of a corresponding object item.

That is, the restoration for one object item is completed as follows: the item discriminator is stored in the message name; the item type is stored in the item type information. The number of the data is read, and the space storing the data is assigned; content of the data is stored sequentially in the storing space assigned; and a memory address corresponding to the storing space is stored in the address information.

As described above, the restoring procedure for the respective object item is repeated, to thereby enable one object to be restored to an object having an original data structure.

With the above configuration, because a new class unlimited to the item type and the number thereof is provided to create various kinds of objects, the time and cost of class design and program development are reduced.

As described above, according to the present invention, a master class to create any kind of an object is provided, to thereby allow functions to be easily added, changed, or deleted without changing a program interface environment by change of content to be implemented.

Also, even when two or more different programs associated with each other are operated, the message object internally configured is converted to a string, and the converted string is transmitted to each other and restored to be an original message object, to thereby allow an interface standardized in all programs to be provided.

Thus, time and cost of class design and program development are reduced.

The hardware included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer-readable storage medium comprising an object-oriented program to cause a computer to execute the object-oriented program, the object-oriented program including an object having object items to store optional data and a plurality of functions processing the data through the object items, comprising:
    a master class comprising:
    attributes, comprising:
    an item discriminator selectively storing item names of the object items,
    an item type information selectively storing an item type of data to be stored in the object item; and
    address information pointing to a memory address stored with the data; and
    functions, comprising: a data storing function receiving the item discriminator, the item type and data value, and allowing the object item to store the data.

2. The computer-readable storage medium according to claim 1, wherein the item discriminator includes a string.

3. The computer-readable storage medium according to claim 2, wherein the item type information is expressed as a string and includes the master class and wherein a corresponding object item can point to another object item storing at least one data.

4. The computer-readable storage medium according to claim 3, wherein the address information comprises a list of pointers to store one or more data.

5. The computer-readable storage medium according to claim 4,
    wherein the item discriminator inputted from the data storing function comprises location information of a predetermined data structure, relation between objects formed by allowing the object items in the object to point other object item, and
    wherein the data storing function stores the data in an object item of a position corresponding to the location information.

6. The computer-readable storage medium according to claim 5,
    wherein a number of layers of the data structure is increased as the object items are increasingly linked, and
    wherein the location information of the data structure comprises item discriminators of other object items provided in an upper layer hierarchically linked to an object item to be stored with data, and separators separating the item discriminators of the object items.

7. The computer-readable storage medium according to claim 6, wherein if an object item exists in a position corresponding to the location information in the data structure, the data storing function sets up the item type as an array item type, and additionally stores the data in the object item.

8. The computer-readable storage medium according to claim 7, wherein if an object item positioned in each layer among the location information does not exist in the data structure, the data storing function creates an object having a name of the object item not existing in each layer as an item discriminator, and a master class as an item type.

9. The computer-readable storage medium according to claim 4, wherein the master class further comprises a string conversion function converting data in the object to a string, and the string conversion function converts the object items to a string comprising an item discriminator, an item type, the number of the data, and content of the data.

10. The computer-readable storage medium according to claim 6, wherein the master class further comprises a string conversion function converting data in the object to a string, and the string conversion function converts the object items to a string comprising a item discriminator, an item type, the number of the data, and content of the data.

11. The computer-readable storage medium according to claim 9, wherein the string conversion function is recursively performed as the number of the data when the string converting function confirms that an item type of the object item is a master class.

12. The computer-readable storage medium according to claim 10, wherein the string conversion function is recursively performed as the number of the data when the string conversion function confirms that an item type of the object item is a master class.

13. The computer-readable storage medium according to claim 9, wherein the converted string further includes object item separators between the converted strings corresponding to the respective object items.

14. The computer-readable storage medium according to claim 10, wherein the converted string further includes object item separators between the converted strings corresponding to the respective object items.

15. The computer-readable storage medium according to claim 9, wherein the master class further comprises an object restoring function restoring a string having data in an object to an original object, and the object restoring function restores the string by applying the data storing function to information of each object item separated from the converted string.

16. The computer-readable storage medium according to claim 10, wherein the master class further comprises an object restoring function restoring a string having data in an object to an original object, and the object restoring function restores the string by applying the data storing function to information of each object item separated from the converted string.

17. The computer-readable storage medium according to claim 15, wherein the object restoring function is assigned with memories according to the number of the data in the information of the respective object items separated from the converted string and stores the data sequentially in the memories.

18. The computer-readable storage medium according to claim 16, wherein the object restoring function is assigned with memories according to the number of the data in the information of the respective object items separated from the converted string and stores the data sequentially in the memories.

19. The computer-readable storage medium of claim 7, wherein the array item type is an integer array or a string array.

20. The computer-readable storage medium of claim 17, wherein the item discriminator is stored in a message name, wherein the item type is stored in an item type information, and wherein the number of the data is read and a space storing the data is assigned.

21. The computer-readable storage medium of claim 18, wherein the item discriminator is stored in a message name, wherein the item type is stored in an item type information, and wherein the number of the data is read and a space storing the data is assigned.

* * * * *

UNITED STATES PATENT AND TRADEMARK OFFICE
CERTIFICATE OF CORRECTION

PATENT NO. : 7,240,074 B2  Page 1 of 1
APPLICATION NO. : 10/705892
DATED : July 3, 2007
INVENTOR(S) : Su-jeong Lee It is certified that error appears in the above-identified patent and that said Letters Patent is hereby corrected as shown below:

Column 11, Line 23, change "a item" to --an item--.

Signed and Sealed this

Fourth Day of December, 2007

JON W. DUDAS
*Director of the United States Patent and Trademark Office*